(12) United States Patent
Yang et al.

(10) Patent No.: US 10,859,879 B2
(45) Date of Patent: Dec. 8, 2020

(54) LIQUID CRYSTAL GRATING AND DRIVING METHOD THEREOF, DISPLAY DEVICE

(71) Applicant: BOE TECHNOLOGY GROUP CO., LTD., Beijing (CN)

(72) Inventors: Ming Yang, Beijing (CN); Xiaochuan Chen, Beijing (CN); Shengji Yang, Beijing (CN); Wenqing Zhao, Beijing (CN); Pengcheng Lu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/341,357

(22) PCT Filed: Sep. 4, 2018

(86) PCT No.: PCT/CN2018/103899
§ 371 (c)(1),
(2) Date: Apr. 11, 2019

(87) PCT Pub. No.: WO2019/062489
PCT Pub. Date: Apr. 4, 2019

(65) Prior Publication Data
US 2019/0265557 A1    Aug. 29, 2019

(30) Foreign Application Priority Data
Sep. 28, 2017    (CN) .......................... 2017 1 0897591

(51) Int. Cl.
*G02B 30/00*    (2020.01)
*G02F 1/1343*    (2006.01)
(Continued)

(52) U.S. Cl.
CPC ....... *G02F 1/134309* (2013.01); *G02B 30/00* (2020.01); *G02B 30/27* (2020.01);
(Continued)

(58) Field of Classification Search
CPC .... H04N 13/31; H04N 13/0409; G02F 1/292; G02F 2001/134381; G09G 3/003; G02B 27/22; G02B 27/2214
See application file for complete search history.

(56) References Cited

U.S. PATENT DOCUMENTS

2012/0327068 A1    12/2012 Takagi et al.
2013/0308067 A1*    11/2013 Hashimoto .......... H04N 13/356
349/15
(Continued)

FOREIGN PATENT DOCUMENTS

CN    201425676 Y    3/2010
CN    102736255 A    10/2012
(Continued)

OTHER PUBLICATIONS

International Search Report and Written Opinion of the International Searching Authority (with English language translation), International Application No. PCT/CN2018/103899, dated Nov. 29, 2018, 11 pp.
(Continued)

*Primary Examiner* — Yuzhen Shen
(74) *Attorney, Agent, or Firm* — Myers Bigel, P.A.

(57) ABSTRACT

The present disclosure provides a liquid crystal grating, a method for driving the liquid crystal grating, and a display device. In the embodiments of the present disclosure, by applying the second voltage and the third voltage that are mutually inverted with respect to the common electrode voltage, the situation in which a single phase voltage is applied to all grating electrodes corresponding to the power-on optical state can be avoided. Due to the capacitance of liquid crystal, the influence of the second voltage on the common electrode voltage and the influence of the third voltage on the common electrode voltage cancel each other out. Therefore, the fluctuation of the common electrode (Continued)

voltage caused by the capacitance of liquid crystal can be effectively reduced or eliminated, thereby avoiding the failure of the liquid crystal grating.

7 Claims, 4 Drawing Sheets

(51) Int. Cl.
*G02F 1/137* (2006.01)
*G02F 1/29* (2006.01)
*G02F 1/133* (2006.01)
*G02B 30/27* (2020.01)

(52) U.S. Cl.
CPC .............. *G02F 1/133* (2013.01); *G02F 1/137* (2013.01); *G02F 1/29* (2013.01); *G02F 2201/121* (2013.01); *G02F 2203/64* (2013.01); *G02F 2203/66* (2013.01)

(56) References Cited

U.S. PATENT DOCUMENTS

2014/0125893 A1* 5/2014 Wu .................. G02B 30/25 349/15

| | | | |
|---|---|---|---|
| 2015/0091886 A1 | 4/2015 | Quan et al. |
| 2015/0160495 A1 | 6/2015 | Yang |
| 2016/0065950 A1 | 3/2016 | Quan et al. |

FOREIGN PATENT DOCUMENTS

| | | | |
|---|---|---|---|
| CN | 103048835 A | 4/2013 |
| CN | 103309094 A | 9/2013 |
| CN | 103424940 A | 12/2013 |
| CN | 103487963 A | 1/2014 |
| CN | 104238164 A | 12/2014 |
| CN | 105388678 A | 3/2016 |
| CN | 106997113 A | 8/2017 |
| JP | 2006-154506 A | 6/2006 |
| WO | 2011/117910 A1 | 9/2011 |

OTHER PUBLICATIONS

First Office Action and English language translation, CN Application No. 201710897591.0, dated Dec. 26, 2019, 12 pp.

"Second Office Action and English language translation", CN Application No. 201710897591.0, dated Jul. 9, 2020, 22 pp.

* cited by examiner

--Related Art--

--Related Art--

LIQUID CRYSTAL GRATING AND DRIVING METHOD THEREOF, DISPLAY DEVICE

CROSS REFERENCE TO RELATED APPLICATIONS

The present application is a 35 U.S.C. 371 national stage application of PCT International Application No. PCT/CN2018/103899, filed on Sep. 4, 2018, which claims the benefit of Chinese Patent Application No. 201710897591.0, filed on Sep. 28, 2017, the contents of which are incorporated herein by reference in their entireties. The above-referenced International Application was published in the Chinese language as International Application Publication No. WO 2019/062489 A1 on Apr. 4, 2019.

TECHNICAL FIELD

The present disclosure relates to the field of display technology, and particularly to a liquid crystal grating, a method for driving the liquid crystal grating, and a display device.

BACKGROUND

When a conventional parallax barrier is used for three-dimensional display, the parallax barrier controls the transmission state of light in the direction of the horizontal axis or the vertical axis. With the parallax barrier, the observer's left and right eyes respectively obtain different images corresponding to the left eye and the right eye, thereby generating three-dimensional vision.

SUMMARY

In an aspect of the present disclosure, a method for driving a liquid crystal grating is provided. The liquid crystal grating includes: a common electrode, m grating electrode groups located opposite to the common electrode, and a liquid crystal layer located between the common electrode and the m grating electrode groups; each grating electrode group includes n grating electrodes; m and n are positive integers; each grating electrode is capable of driving a corresponding portion of the liquid crystal layer to switch between an initial optical state and a power-on optical state. The method includes: applying a common electrode voltage to the common electrode; applying a first voltage to a grating electrode corresponding to the initial optical state; and applying a second voltage to a portion of the grating electrodes corresponding to the power-on optical state in the m grating electrode groups, and applying a third voltage to rest of the grating electrodes corresponding to the power-on optical state in the m grating electrode groups; the second voltage and the third voltage being mutually inverted with respect to the common electrode voltage; a difference between the second voltage and the common electrode voltage is equal to a difference between the common electrode voltage and the third voltage.

Optionally, the step of applying the second voltage to the portion of the grating electrodes corresponding to the power-on optical state in the m grating electrode groups, and applying the third voltage to the rest of the grating electrodes corresponding to the power-on optical state in the m grating electrode groups, includes: applying the second voltage to each grating electrode corresponding to the power-on optical state in a (2a+1)-th grating period; and applying the third voltage to each grating electrode corresponding to the power-on optical state in a (2a+2)-th grating period; a is a natural number.

Optionally, the step of applying the second voltage to the portion of the grating electrodes corresponding to the power-on optical state in the m grating electrode groups, and applying the third voltage to the rest of the grating electrodes corresponding to the power-on optical state in the m grating electrode groups, includes: applying the second voltage to a (2b+1)-th grating electrode corresponding to the power-on optical state in each grating period, and applying the third voltage to a (2b+2)-th grating electrode corresponding to the power-on optical state in each grating period; b is a natural number.

Optionally, the first voltage is same to the common electrode voltage. Optionally, the liquid crystal grating is a normally white type liquid crystal grating; the initial optical state is a light transmitting state, and the power-on optical state is a light shielding state.

Optionally, the liquid crystal grating is a normally black type liquid crystal grating; the initial optical state is a light shielding state, and the power-on optical state is a light transmitting state.

In another aspect of the present disclosure, a liquid crystal grating is provided. The liquid crystal grating includes: a common electrode, m grating electrode groups located opposite to the common electrode, and a liquid crystal layer located between the common electrode and the m grating electrode groups; each grating electrode group includes n grating electrodes; m and n are positive integers; each grating electrode is capable of driving a corresponding portion of the liquid crystal layer to switch between an initial optical state and a power-on optical state. A portion of the grating electrodes corresponding to the power-on optical state in the m grating electrode groups are directly connected to each other, and rest of the grating electrodes corresponding to the power-on optical state in the m grating electrode groups are directly connected to each other.

In some embodiments, a second voltage is applied to a portion of the grating electrodes corresponding to the power-on optical state in the m grating electrode groups, and a third voltage is applied to the rest of the grating electrodes corresponding to the power-on optical state in the m grating electrode groups; the second voltage and the third voltage are mutually inverted with respect to the common electrode voltage; a difference between the second voltage and the common electrode voltage is equal to a difference between the common electrode voltage and the third voltage.

Optionally, the grating electrodes corresponding to the power-on optical state in a (2a+1)-th grating period are connected to each other; the grating electrodes corresponding to the power-on optical state in a (2a+2)-th grating period are connected to each other; a is a natural number. Alternatively, the second voltage is applied to each grating electrode corresponding to the power-on optical state in a (2a+1)-th grating period; and the third voltage is applied to each grating electrode corresponding to the power-on optical state in a (2a+2)-th grating period; a is a natural number.

Optionally, the liquid crystal grating further includes $2n$ grating electrode leads. $2n$ grating electrodes in a (2a+1)-th grating period and a (2a+2)-th grating period are sequentially connected to the $2n$ grating electrode leads, respectively.

Optionally, the second voltage is applied to a (2b+1)-th grating electrode corresponding to the power-on optical state in each grating period, and the third voltage is applied to a (2b+2)-th grating electrode corresponding to the power-on optical state in each grating period; b is a natural number.

Optionally, the liquid crystal grating further includes n grating electrode leads, and n grating electrodes in each grating period are sequentially connected to the n grating electrode leads, respectively.

Optionally, the first voltage is same to the common electrode voltage.

Optionally, the liquid crystal grating is a normally white liquid crystal grating; the initial optical state is a light transmitting state, and the power-on optical state is a light shielding state.

Optionally, the liquid crystal grating is a normally black liquid crystal grating; the initial optical state is a light shielding state, and the power-on optical state is a light transmitting state.

In yet another aspect of the present disclosure, a display device is provided. The display device includes a display panel and the liquid crystal grating according to the above-mentioned embodiments. The liquid crystal grating is located on a light exit side or a light entrance side of the display panel.

BRIEF DESCRIPTION OF THE DRAWINGS

In order to more clearly illustrate the technical solutions in embodiments of the disclosure or in the prior art, the appended drawings needed to be used in the description of the embodiments or the prior art will be introduced briefly in the following. Obviously, the drawings in the following description are only some embodiments of the disclosure, and for those of ordinary skills in the art, other drawings may be obtained according to these drawings under the premise of not paying out creative work.

DETAILED DESCRIPTION OF THE DISCLOSURE

In the following, the technical solutions in embodiments of the disclosure will be described clearly and completely in connection with the drawings in the embodiments of the disclosure. Obviously, the described embodiments are only part of the embodiments of the disclosure, and not all of the embodiments. Based on the embodiments in the disclosure, all other embodiments obtained by those of ordinary skills in the art under the premise of not paying out creative work pertain to the protection scope of the disclosure.

Figure 1:
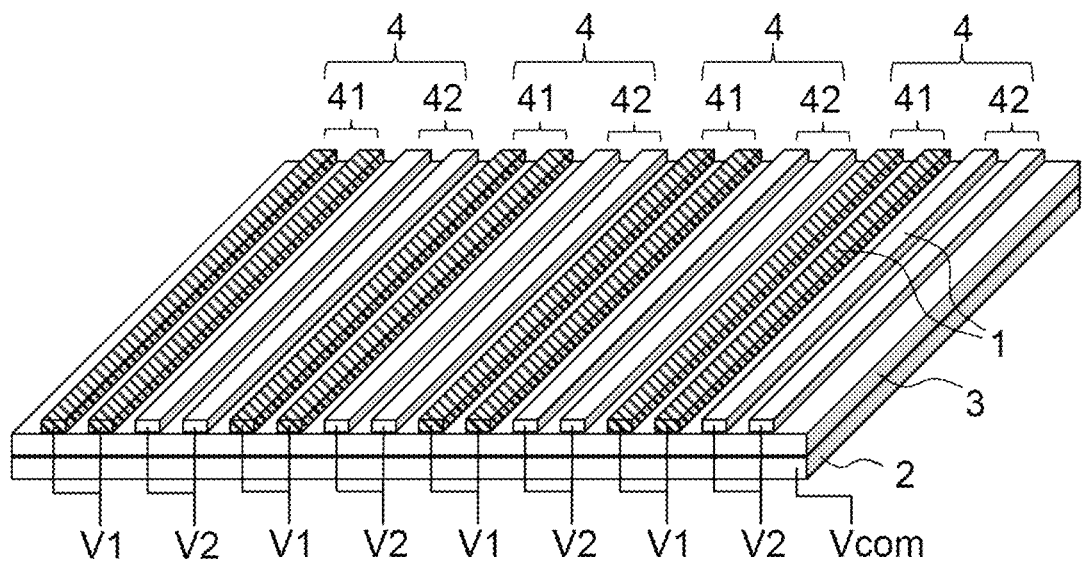
FIG. 1 is a structural schematic diagram of a liquid crystal grating in the related art.
Figure 2:
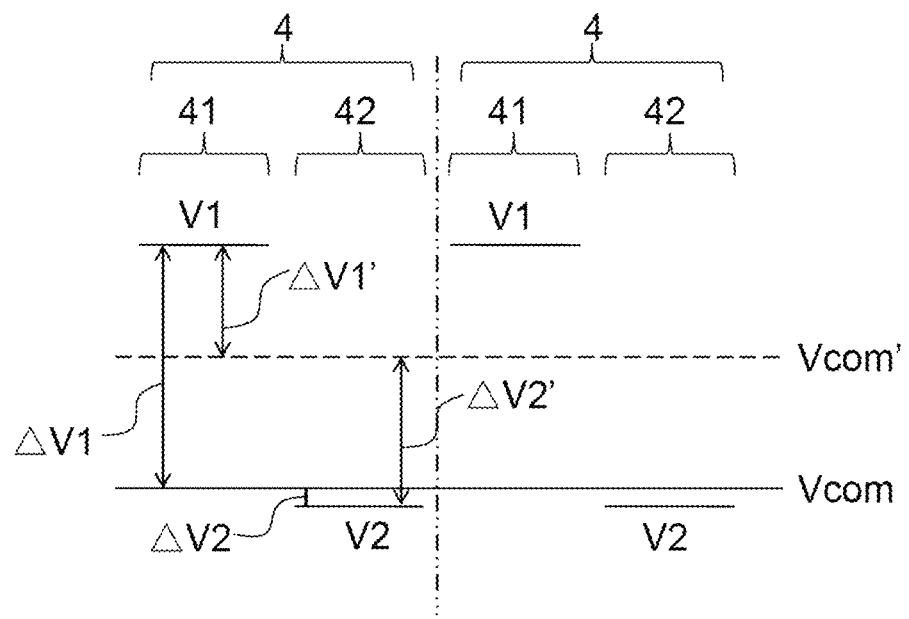
FIG. 2 is a schematic diagram showing the liquid crystal grating of FIG. 1 with voltages applied.

As shown in FIG. 1, in the related art, a liquid crystal grating for three-dimensional display includes a plurality of grating electrodes 1, a common electrode 2, and a liquid crystal layer 3 disposed between the grating electrodes 1 and the common electrode 2. Each of the grating electrodes 1 may be strip-shaped. The plurality of grating electrodes 1 are grouped into a plurality of grating periods 4 when performing three-dimensional display. As shown in FIG. 2, for example, for a normally white type liquid crystal grating, a voltage V1 is applied to the grating electrode 1 corresponding to a light shielding portion 41 in each grating period 4, and a voltage V2 is applied to the grating electrode 1 corresponding to a light transmitting portion 42 in each grating period 4. Generally, V2 is approximately equal to the voltage Vcom of the common electrode 2 (as shown in FIG. 2, the difference $\Delta V2$ between V2 and Vcom is negligible). When the difference $\Delta V1$ between V1 and Vcom is larger than a predetermined operating voltage, the liquid crystal molecules corresponding to the light shielding portion 41 is deflected, thereby forming the light shielding portion 41.

The inventors have found that the common electrode voltage varies with the voltage of the grating electrode due to the capacitance of liquid crystal. In particular, as shown in FIG. 2, when the aperture ratio of the grating period 4 is less than 50% (that is, the area of the light shielding portion 41 in the grating period 4 is larger than 50% of the area of the grating period), the grating electrodes corresponding to the light shielding portion 41 are applied with a voltage V1. In this case, the voltage Vcom of the common electrode will be pulled up significantly to Vcom'. For the liquid crystal corresponding to the light shielding portion 41, the voltage difference $\Delta V1'$ loaded on both sides of the liquid crystal is remarkably reduced with respect to the predetermined $\Delta V1$, and the transparency of this region is significantly improved. Therefore, the predetermined light shielding portion may fail or even become a light transmitting portion. Conversely, for the liquid crystal corresponding to the light transmitting portion 42, the voltage difference $\Delta V2'$ loaded on both sides of the liquid to crystal is significantly increased with respect to the predetermined $\Delta V2$, and the transparency of this region is significantly lowered. Therefore, the predetermined light transmitting portion may fail or even become a light shielding portion. In this case, the light shielding portion 41 and the light transmitting portion 42 in the liquid crystal grating may be disturbed and cause the failure of the liquid crystal grating.

In view of this, embodiments of the present disclosure provide a liquid crystal grating, a driving method thereof, and a display device, which stabilize the voltage on the common electrode and effectively avoid the failure of the liquid crystal grating.

Figure 3:
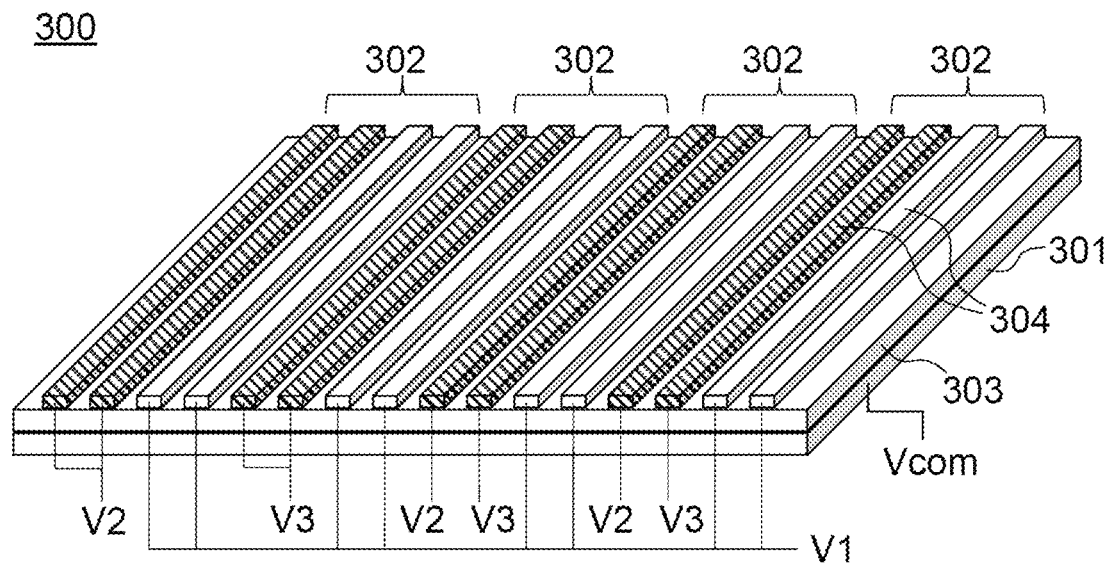
FIG. 3 is a schematic diagram of a liquid crystal grating according to an embodiment of the present disclosure.

In an aspect of the present disclosure, a liquid crystal grating is provided. As shown in FIG. 3, the liquid crystal grating 300 includes: a common electrode 301, m grating electrode groups 302 located opposite to the common electrode 301, and a liquid crystal layer 303 located between the common electrode 301 and the m grating electrode groups 302. Each grating electrode group 302 includes n grating electrodes 304; m and n are positive integers. Each grating electrode 304 is capable of driving a corresponding portion of the liquid crystal layer to switch between an initial optical state and a power-on optical state. A portion of the grating electrodes 304 corresponding to the power-on optical state in the m grating electrode groups 302 are directly connected to each other, and rest of the grating electrodes 304 corresponding to the power-on optical state in the m grating electrode groups 302 are directly connected to each other.

Figure 4:
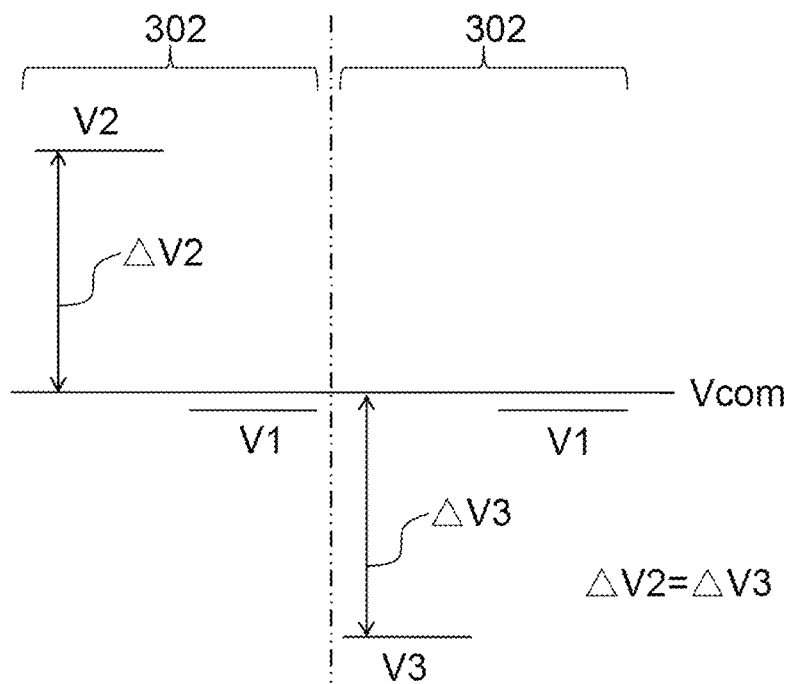
FIG. 4 is a schematic diagram showing the liquid crystal grating of FIG. 3 with voltages applied.

In some embodiments, the common electrode 301 is applied with a common electrode voltage Vcom. The grating electrode(s) 304 corresponding to the initial optical state is applied with a first voltage V1. A second voltage V2 is applied to a portion of the grating electrodes 304 corresponding to the power-on optical state in the m grating electrode groups 302, and a third voltage V3 is applied to the rest of the grating electrodes 304 corresponding to the power-on optical state in the m grating electrode groups 302; the second voltage V2 and the third voltage V3 are mutually inverted with respect to the common electrode voltage Vcom; a difference ΔV2 between the second voltage V2 and the common electrode voltage Vcom is equal to a difference ΔV3 between the common electrode voltage Vcom and the third voltage V3, as shown in FIG. 4.

In the embodiment of the present disclosure, the common electrode is applied with the common electrode voltage, and the grating electrode(s) corresponding to the initial optical state is applied with the first voltage. The second voltage is applied to the portion of the grating electrodes corresponding to the power-on optical state in the m grating electrode groups, and the third voltage is applied to the rest of the grating electrodes corresponding to the power-on optical state in the m grating electrode groups; the second voltage and the third voltage are mutually inverted with respect to the common electrode voltage; the difference between the second voltage and the common electrode voltage is equal to the difference between the common electrode voltage and the third voltage. Compared to the traditional driving method, in the embodiments of the present disclosure, by applying the second voltage and the third voltage that are mutually inverted with respect to the common electrode voltage, the situation in which a single phase voltage is applied to all grating electrodes corresponding to the power-on optical state can be avoided. Due to the capacitance of liquid crystal, the influence of the second voltage on the common electrode voltage and the influence of the third voltage on the common electrode voltage cancel each other out. Therefore, the fluctuation of the common electrode voltage caused by the capacitance of liquid crystal can be effectively reduced or eliminated, thereby avoiding the failure of the liquid crystal grating.

In the context of the present disclosure, "mutually inverted" means that the two voltages respectively have a positive value and a negative value with respect to a reference voltage (e.g., the common electrode voltage), and these two voltages need not to have the same absolute value with respect to the reference voltage. A "grating electrode corresponding to a certain state" refers to a grating electrode to be in this state. For example, a "grating electrode corresponding to the power-on optical state" means that the grating electrode needs to be energized so as to be in the power-on optical state different from the initial optical state; similarly, a "grating electrode corresponding to the initial optical state" means that the grating electrode does not need to be energized and thus is in the initial optical state different from the power-on optical state.

In an example provided by the present disclosure, the liquid crystal grating is a normally white liquid crystal grating, the initial optical state is a light transmitting state, and the power-on optical state is a light shielding state. It can be understood by those skilled in the art that the liquid crystal grating may also be a normally black liquid crystal grating. Accordingly, the initial optical state may be a light shielding state, and the power-on optical state may be a light transmitting state.

With n grating electrodes in each grating period, the widths of the light shielding portion and the light transmitting portion of the liquid crystal grating can be adjusted according to the requirements on the display. Also, the grating period (corresponding to the number n of the grating electrodes) can be adjusted to realize three-dimensional display for different distances and positions. Therefore, the liquid crystal grating provided by the embodiment of the present disclosure may also be an adjustable liquid crystal grating.

Optionally, as shown in FIG. 3, the grating electrodes 304 corresponding to the power-on optical state in a (2a+1)-th grating period 302 are connected to each other; the grating electrodes 304 corresponding to the power-on optical state in a (2a+2)-th grating period 302 are connected to each other; a is a natural number. Alternatively, as shown in FIG. 5, the second voltage V2 is applied to each grating electrode 304 corresponding to the power-on optical state in a (2a+1)-th grating period 302; and the third voltage V3 is applied to each grating electrode 304 corresponding to the power-on optical state in a (2a+2)-th grating period 302; a is a natural number.

In some embodiments, the second voltage is applied to the grating electrode(s) corresponding to the power-on optical state in the odd-numbered grating periods; the third voltage is applied to the grating electrode(s) corresponding to the power-on optical state in the even-numbered grating period. That is, the second voltage and the third voltage are respectively applied to two directly adjacent grating periods. With such a spatial distribution, two directly adjacent grating periods have opposite voltages with respect to the common electrode voltage. Therefore, in the liquid crystal grating, the influence of the second voltage on the common electrode voltage almost completely cancels out the influence of the third voltage on the common electrode voltage, thereby further stabilizing the common electrode voltage.

Figure 5:
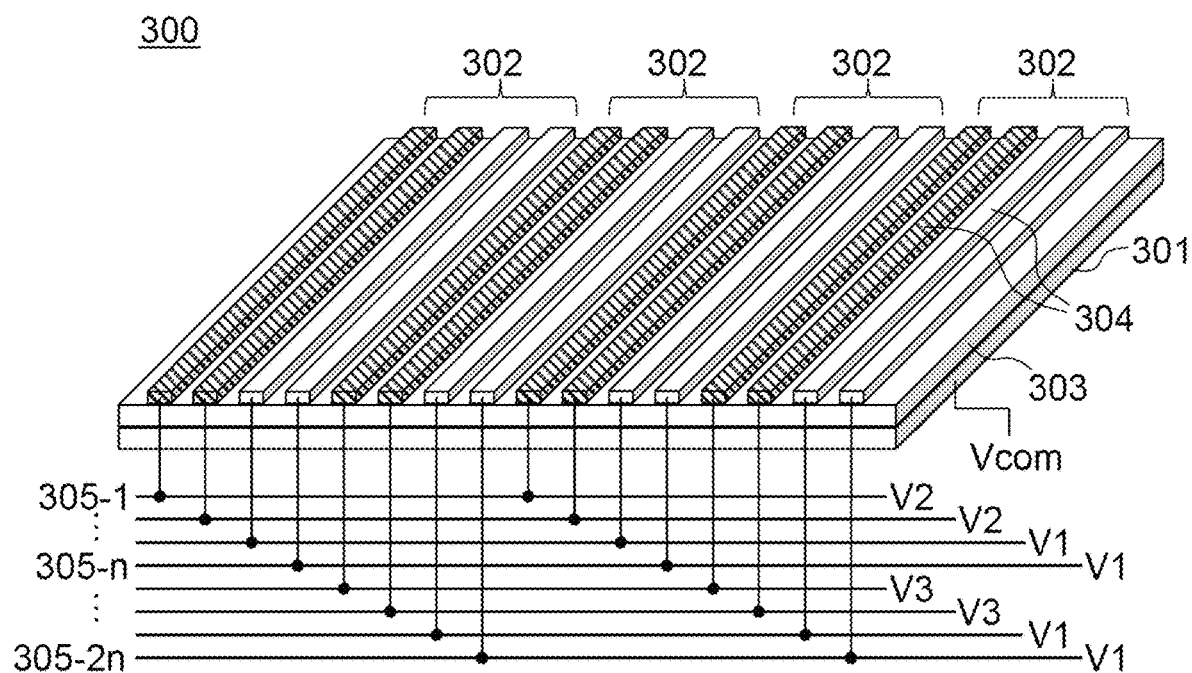
FIG. 5 is a schematic diagram of a liquid crystal grating according to another embodiment of the present disclosure.

Optionally, as shown in FIG. 5, the liquid crystal grating 300 further includes 2n grating electrode leads 305-1 to 305-2n. 2n grating electrodes 304 in a (2a+1)-th grating period 302 and a (2a+2)-th grating period 302 are sequentially connected to the 2n grating electrode leads 305-1 to 305-2n, respectively. Although n=4 is described as an example in the present disclosure, n may be other positive integers such as 3, 5, 6, 7, 8, and the like.

In some embodiments, the common electrode voltage, the first voltage, the second voltage, and the third voltage can be applied to respective grating electrodes respectively through 2n grating electrode leads.

Figure 6:
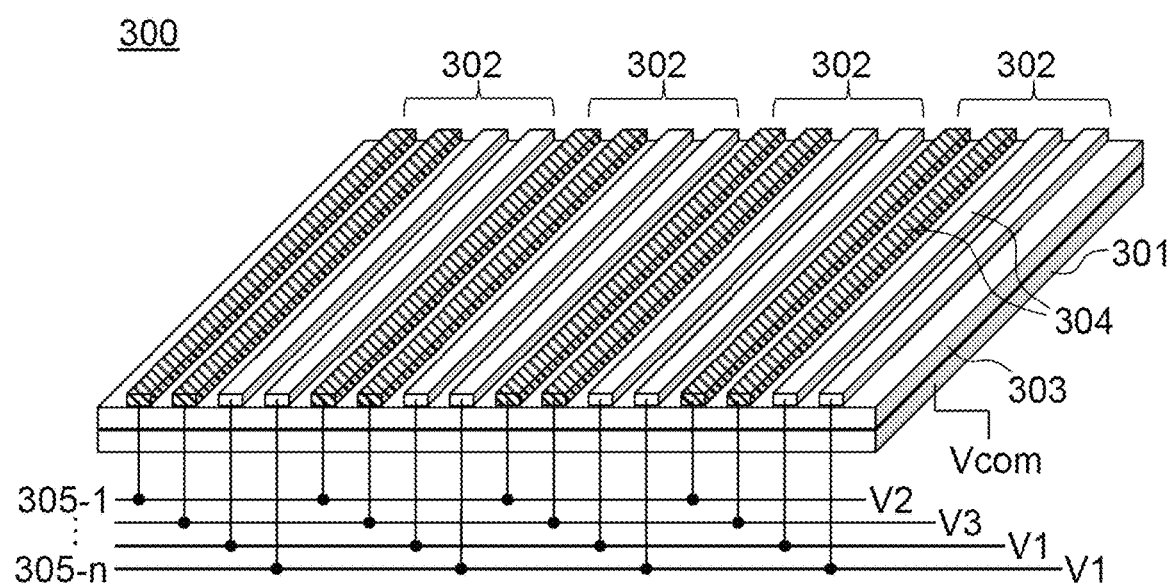
FIG. 6 is a schematic diagram of a liquid crystal grating according to yet another embodiment of the present disclosure.

Optionally, as shown in FIG. 6, the second voltage V2 is applied to a (2b+1)-th grating electrode 304 corresponding to the power-on optical state in each grating period 302, and the third voltage V3 is applied to a (2b+2)-th grating electrode 304 corresponding to the power-on optical state in each grating period 302; b is a natural number.

In some embodiments, the second voltage is applied to the odd-numbered grating electrode(s) corresponding to the power-on optical state in each grating period, and the third voltage is applied to the even-numbered grating electrode(s) corresponding to the power-on optical state in each grating period. That is, the second voltage and the third voltage are respectively applied to two adjacent grating electrodes corresponding to the power-on optical state in the same grating period. With such a spatial distribution, the interior of the same grating period has opposite voltages with respect to the common electrode voltage. Therefore, in the liquid crystal grating, the influence of the second voltage on the common electrode voltage almost completely cancels out the influence of the third voltage on the common electrode voltage, thereby further stabilizing the common electrode voltage.

Optionally, as shown in FIG. 6, the liquid crystal grating further includes n grating electrode leads 305-1 to 305-n, and n grating electrodes 304 in each grating period 302 are sequentially connected to the n grating electrode leads 305-1 to 305-n, respectively.

In some embodiments, the common electrode voltage, the first voltage, the second voltage, and the third voltage can be applied to respective grating electrodes respectively through n grating electrode leads. Such a wiring scheme further simplifies the peripheral circuits of the liquid crystal grating.

Those skilled in the art can understand that in the embodiment of the present disclosure, when the shapes and areas of all the grating electrodes are the same, the number of the grating electrodes applied with the second voltage may be equal to the number of the grating electrodes applied with the third voltage, thereby completely eliminating the influence of the second voltage and the third voltage on the common electrode voltage. However, when the ratio of the number of the grating electrodes applied with the second voltage to the number of the grating electrodes applied with the third voltage is in the range of 1:1 to 1:5, a desired effect can also be obtained. Moreover, embodiments of the present disclosure are not limited to the manner of applying the second voltage and the third voltage shown in the drawings. For example, in the embodiment shown in FIG. 3, the second voltage and the third voltage may be respectively applied to two directly adjacent grating periods; alternatively, the second voltage and the third voltage may be respectively applied to two directly adjacent grating electrodes corresponding to the power-on optical state in the same grating period.

Optionally, the first voltage V1 is same to the common electrode voltage Vcom.

In some embodiments, the first voltage is the same as the common electrode voltage, thereby eliminating the influence of the first voltage on the common electrode voltage, and further stabilizing the common electrode voltage.

Optionally, the liquid crystal grating is a normally white liquid crystal grating; the initial optical state is a light transmitting state, and the power-on optical state is a light shielding state.

In some embodiments, the liquid crystal grating is a normally white liquid crystal grating, the initial optical state is a light transmitting state, and the power-on optical state is a light shielding state. In each grating period, a plurality of grating electrodes corresponding to the power-on optical state form a light shielding portion, and a plurality of grating electrodes corresponding to the initial optical state form a light transmitting portion, thereby forming a stripe structure of the liquid crystal grating.

Optionally, the liquid crystal grating is a normally black liquid crystal grating; the initial optical state is a light shielding state, and the power-on optical state is a light transmitting state.

In some embodiments, the liquid crystal grating is a normally black liquid crystal grating, the initial optical state is a light shielding state, and the power-on optical state is a light transmitting state. In each grating period, a plurality of grating electrodes corresponding to the power-on optical state form a light transmitting portion, and a plurality of grating electrodes corresponding to the initial optical state form a light shielding portion, thereby forming a stripe structure of the liquid crystal grating.

Figure 7A:
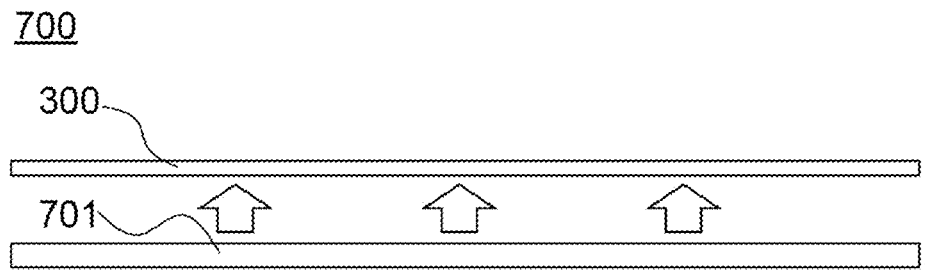
FIG. 7($a$) and FIG. 7($b$) are structural schematic diagrams of liquid crystal gratings according to the embodiments of the present disclosure.
Figure 7B:
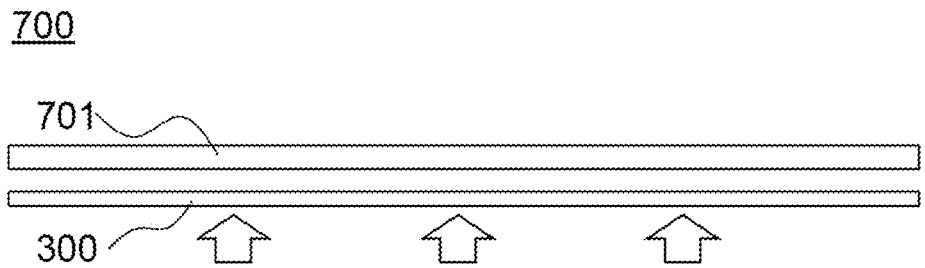

In another aspect of the present disclosure, a display device is provided. As shown in FIG. 7(a), the display device 700 includes a display panel 701 and the liquid crystal grating 300 according to the above-mentioned embodiments. The liquid crystal grating 300 is located on a light exit side of the display panel 701. In this embodiment, the display panel 701 may be a liquid crystal display panel or an OLED display panel. Alternatively, as shown in FIG. 7(b), in another embodiment of the present disclosure, the liquid crystal grating 300 may also be disposed on the light entrance side of the display panel 701. In this embodiment, the display panel 701 may be a liquid crystal display panel. The display device can be any product or component having a display function, such as a mobile phone, a tablet computer, a television, a display, a notebook computer, a digital photo frame, a navigator, and the like. For the implementation of the display device, reference may be made to the embodiment of the liquid crystal grating described above, which will be repeated herein.

Figure 8:
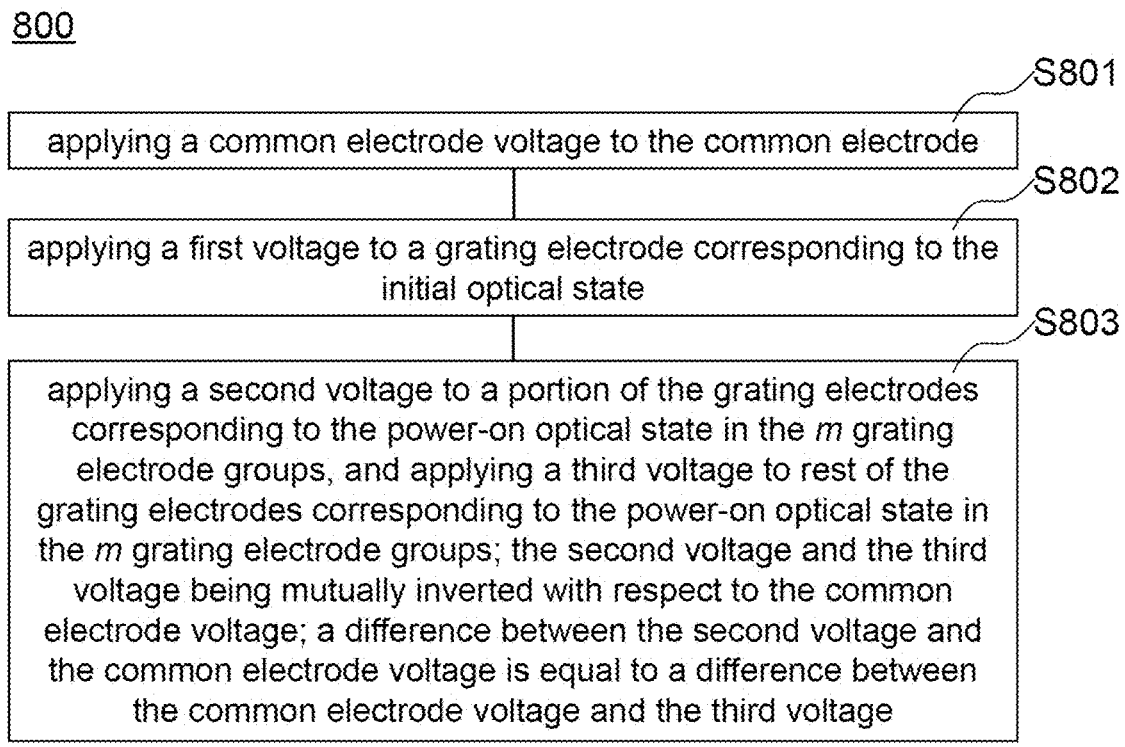
FIG. 8 is a flow chart of a method for driving a liquid crystal grating according to an embodiment of the present disclosure.

In yet another aspect of the present disclosure, a method for driving a liquid crystal grating is provided. The liquid crystal grating includes: a common electrode, m grating electrode groups located opposite to the common electrode, and a liquid crystal layer located between the common electrode and the m grating electrode groups; each grating electrode group includes n grating electrodes; m and n are positive integers; each grating electrode is capable of driving a corresponding portion of the liquid crystal layer to switch between an initial optical state and a power-on optical state. As shown in FIG. 8, the method 800 includes the following steps: S801 applying a common electrode voltage to the common electrode; S802 applying a first voltage to a grating electrode corresponding to the initial optical state; and S803 applying a second voltage to a portion of the grating electrodes corresponding to the power-on optical state in the m grating electrode groups, and applying a third voltage to rest of the grating electrodes corresponding to the power-on optical state in the m grating electrode groups; the second voltage and the third voltage being mutually inverted with respect to the common electrode voltage; a difference between the second voltage and the common electrode voltage is equal to a difference between the common electrode voltage and the third voltage.

Compared to the traditional driving method, in the embodiments of the present disclosure, by applying the second voltage and the third voltage that are mutually inverted with respect to the common electrode voltage, the situation in which a single phase voltage is applied to all grating electrodes corresponding to the power-on optical state can be avoided. Due to the capacitance of liquid crystal, the influence of the second voltage on the common electrode voltage and the influence of the third voltage on the common electrode voltage cancel each other out. Therefore, the fluctuation of the common electrode voltage caused by the capacitance of liquid crystal can be effectively reduced or eliminated, thereby avoiding the failure of the liquid crystal grating.

Optionally, step S803 of applying the second voltage to the portion of the grating electrodes corresponding to the power-on optical state in the m grating electrode groups, and applying the third voltage to the rest of the grating electrodes corresponding to the power-on optical state in the m grating electrode groups, includes: applying the second voltage to each grating electrode corresponding to the power-on optical state in a (2a+1)-th grating period; and applying the third voltage to each grating electrode corresponding to the power-on optical state in a (2a+2)-th grating period; a is a natural number.

In some embodiments, the second voltage is applied to the grating electrode(s) corresponding to the power-on optical state in the odd-numbered grating periods; the third voltage is applied to the grating electrode(s) corresponding to the power-on optical state in the even-numbered grating period. That is, the second voltage and the third voltage are respectively applied to two directly adjacent grating periods. With such a spatial distribution, two directly adjacent grating periods have opposite voltages with respect to the common electrode voltage. Therefore, in the liquid crystal grating, the influence of the second voltage on the common electrode voltage almost completely cancels out the influence of the third voltage on the common electrode voltage, thereby further stabilizing the common electrode voltage.

Optionally, the step of applying the second voltage to the portion of the grating electrodes corresponding to the power-on optical state in the m grating electrode groups, and applying the third voltage to the rest of the grating electrodes corresponding to the power-on optical state in the m grating electrode groups, includes: applying the second voltage to a (2b+1)-th grating electrode corresponding to the power-on optical state in each grating period, and applying the third voltage to a (2b+2)-th grating electrode corresponding to the power-on optical state in each grating period; b is a natural number.

In some embodiments, the second voltage is applied to the odd-numbered grating electrode(s) corresponding to the power-on optical state in each grating period, and the third voltage is applied to the even-numbered grating electrode(s) corresponding to the power-on optical state in each grating period. That is, the second voltage and the third voltage are respectively applied to two adjacent grating electrodes corresponding to the power-on optical state in the same grating period. With such a spatial distribution, the interior of the same grating period has opposite voltages with respect to the common electrode voltage. Therefore, in the liquid crystal grating, the influence of the second voltage on the common electrode voltage almost completely cancels out the influence of the third voltage on the common electrode voltage, thereby further stabilizing the common electrode voltage.

Optionally, the first voltage is same to the common electrode voltage.

In some embodiments, the first voltage is the same as the common electrode voltage, thereby eliminating the influence of the first voltage on the common electrode voltage, and further stabilizing the common electrode voltage.

Optionally, the liquid crystal grating is a normally white type liquid crystal grating; the initial optical state is a light transmitting state, and the power-on optical state is a light shielding state. Alternatively, the liquid crystal grating is a normally black type liquid crystal grating; the initial optical state is a light shielding state, and the power-on optical state is a light transmitting state.

According to the liquid crystal grating, the method for driving the liquid crystal grating, and the display device provided by the embodiments of the present disclosure, by applying the second voltage and the third voltage that are mutually inverted with respect to the common electrode voltage, the situation in which a single phase voltage is applied to all grating electrodes corresponding to the power-on optical state can be avoided. Due to the capacitance of liquid crystal, the influence of the second voltage on the common electrode voltage and the influence of the third voltage on the common electrode voltage cancel each other out. Therefore, the fluctuation of the common electrode voltage caused by the capacitance of liquid crystal can be effectively reduced or eliminated, thereby avoiding the failure of the liquid crystal grating.

The above embodiments are only used for explanations rather than limitations to the present disclosure, the ordinary skilled person in the related technical field, in the case of not departing from the spirit and scope of the present disclosure, may also make various modifications and variations, therefore, all the equivalent solutions also belong to the scope of the present disclosure, the patent protection scope of the present disclosure should be defined by the claims.

What is claimed is:

1. A method for driving a liquid crystal grating, wherein the liquid crystal grating comprises a common electrode, m grating electrode groups opposite to the common electrode, and a liquid crystal layer between the common electrode and the m grating electrode groups, wherein each grating electrode group comprises n grating electrodes, wherein m and n are positive integers, wherein each grating electrode is configured to drive a corresponding portion of the liquid crystal layer to switch between an initial optical state and a power-on optical state, the method comprising:
　　applying a common electrode voltage to the common electrode;
　　applying a first voltage to a grating electrode of the n grating electrodes of the m grating electrode groups, wherein the grating electrode corresponds to the initial optical state;
　　applying a second voltage to a portion of the n grating electrodes corresponding to the power-on optical state in the m grating electrode groups; and
　　applying a third voltage to remaining ones of the portion of the n grating electrodes corresponding to the power-on optical state in the m grating electrode groups,
　　wherein the second voltage and the third voltage are mutually inverted with respect to the common electrode voltage,
　　wherein a difference between the second voltage and the common electrode voltage is equal to a difference between the common electrode voltage and the third voltage, and
　　wherein applying the second voltage to the portion of the n grating electrodes corresponding to the power-on optical state in the m grating electrode groups, and applying the third voltage to the remaining ones of the portion of the n grating electrodes corresponding to the power-on optical state in the m grating electrode groups comprises: applying the second voltage to a (2b+1)-th grating electrode corresponding to the power-on optical state in each grating period; and applying the third voltage to a (2b+2)-th grating electrode corresponding to the power-on optical state in each grating period, wherein b is a natural number.

2. The method according to claim 1,
　　wherein the first voltage is same as the common electrode voltage.

3. The method according to claim 1,
　　wherein the liquid crystal grating is a normally white type liquid crystal grating,
　　wherein the initial optical state comprises a light transmitting state, and
　　wherein the power-on optical state comprises a light shielding state.

4. The method according to claim 1,
　　wherein the liquid crystal grating is a normally black type liquid crystal grating,
　　wherein the initial optical state comprises a light shielding state, and wherein the power-on optical state comprises a light transmitting state.

5. The method according to claim 1, wherein the first voltage is same as the common electrode voltage.

6. The method according to claim 1,
wherein the liquid crystal grating is a normally white type liquid crystal grating,
wherein the initial optical state comprises a light transmitting state, and
wherein the power-on optical state comprises a light shielding state.

7. The method according to claim 1,
wherein the liquid crystal grating is a normally black type liquid crystal grating,
wherein the initial optical state comprises a light shielding state, and
wherein the power-on optical state comprises a light transmitting state.

* * * * *